May 14, 1935.  J. A. STREUN  2,001,223
COTTON MACHINE
Filed Aug. 15, 1930

Inventor
John A. Streun
By Jesse R. Stone
Lester B. Clark Attorney

Patented May 14, 1935

2,001,223

UNITED STATES PATENT OFFICE 2,001,223

COTTON MACHINE

John Arnold Streun, Sherman, Tex., assignor to Hardwicke-Etter Company, Sherman, Tex., a corporation Application August 15, 1930, Serial No. 475,575

4 Claims. (Cl. 19—37)

My invention relates to improvements in machines for handling cotton in the ginning operation. It is intended particularly for cleaning and hulling the cotton.

It is an object of my invention to provide an effective means for moving the cotton into contact with the saws which remove the lint from the hulls and chaff. I desire to agitate and shake up the cotton into contact with the saws and to also provide for moving the cotton and hulls longitudinally so that the lint may be effectively removed from the hulls and foreign material.

It is also an object of the invention to provide a machine of this character which may handle cotton of different character so that dirty cotton may be effectively cleaned and other cotton which is not dirty or filled with hulls and chaff may be fed past the saws without the necessity of a contact with the agitating means.

I provide an effective system of valve plates which may be moved to direct the cotton in the desired channel.

Figure 1:
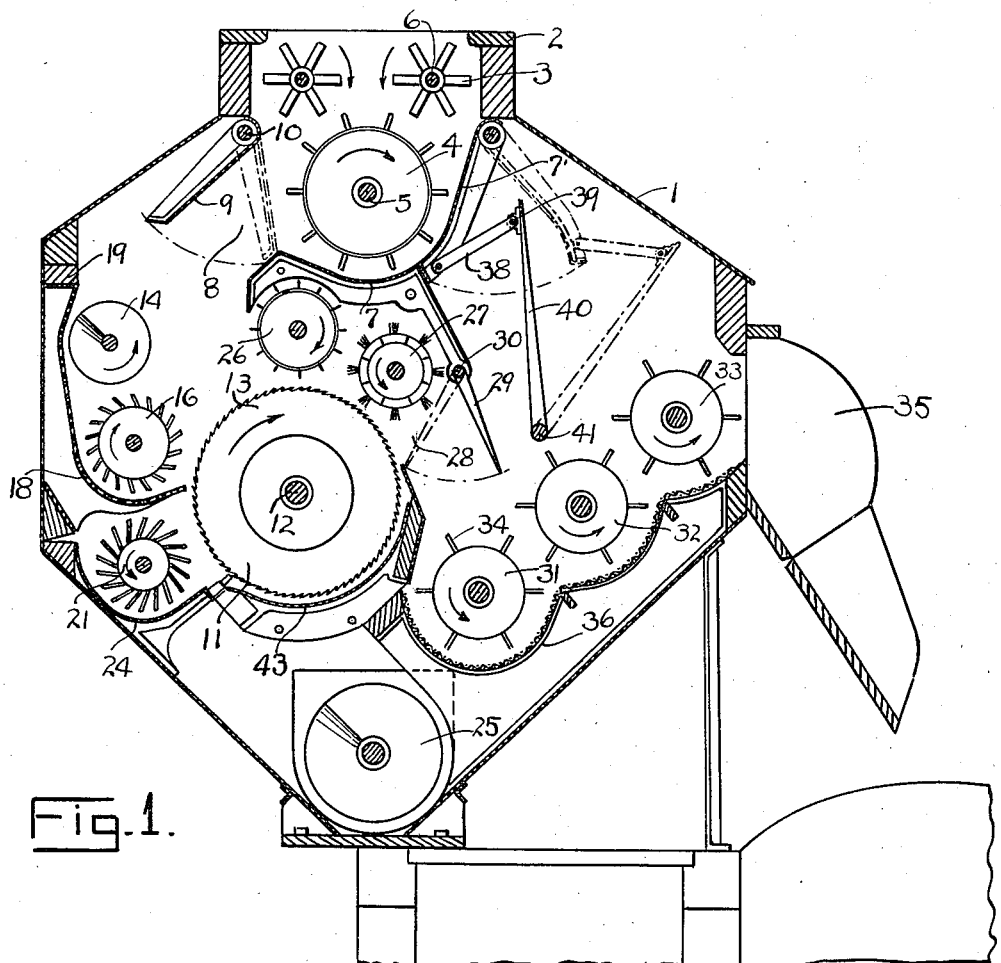

In the drawing herewith Fig. 1 is a vertical section through a housing taken at the ends of the rollers and illustrating the construction of my device.

Figure 2:
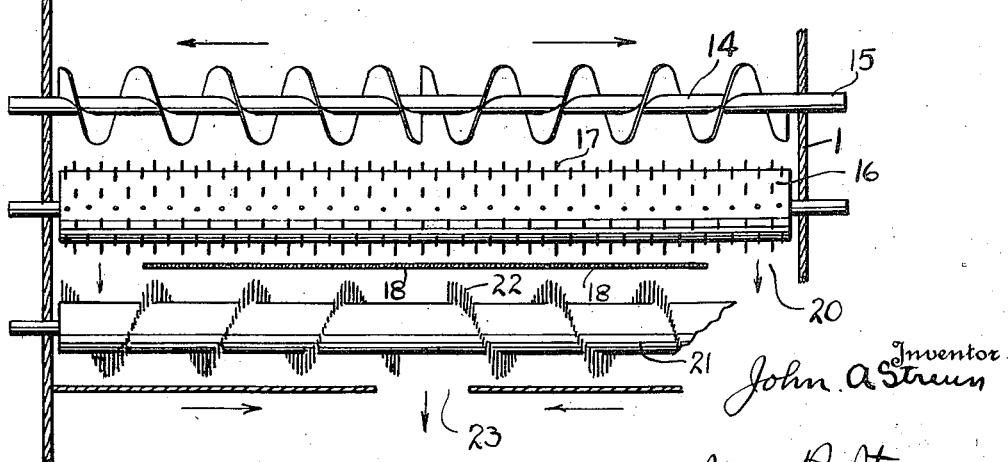

Fig. 2 is a broken front elevation of the rolls and conveyors by means of which the cotton is brought into contact with the saw cylinder.

My device includes an outer housing 1 shaped to receive the operating members constituting the complete assembly. The shafts of the rolls and cylinders are mounted in the side walls of the housing and are rotatable by any desirable means.

The cotton is fed to the housing through a hopper 2 at the upper end thereof. Within this hopper is an agitator roll 4 mounted for rotation upon a shaft 5. Above the agitator roll are two distributor rolls 3 mounted upon shafts 6. The two distributor rolls have radial flights thereon to engage the cotton and move it inwardly against the agitator roll 4. Below the agitator roll is an enclosing wall 7, the upper rearward portion of which, indicated at 7', is adapted to be moved laterally away from the agitator roll to allow the cotton to pass in that direction. On the forward side of the said roll is an opening indicated at 8 through which the cotton may be discharged to the cleaning and hulling apparatus. This opening 8, however, may be closed by a valve 9 pivoted on a shaft 10 to swing to open or closed position. The valve 9 may be made of sheet metal although this construction may be varied.

Below the feeder thus described is a saw cylinder 11 mounted for rotation with a shaft 12 journaled in the housing. This saw cylinder is similar to the hulling saw cylinders employed in cotton machines of this character and is adapted to engage the lint by means of teeth 13 on the outer edges, rotating to carry the lint over the upper side of the roll to discharge it rearwardly. Below this saw cylinder is a partition 43 curved to conform to the shape of the saw cylinder and preferably made of screen material to allow the chaff and dirt to settle downwardly.

The cotton entering through the opening 8 toward the saw cylinder is received upon a conveyor roll 14. The construction of this conveyor is shown best in Fig. 2. The screw blade upon the conveyor is mounted upon a shaft 15 journaled in the side wall of the housing 1. The screw blades are so formed upon the shaft as to move the material in both directions away from the middle. Thus cotton entering adjacent the middle of the housing will be moved laterally toward the side walls thereof.

Immediately below the conveyor is a picker roll 16. This roll comprises a cylinder member having outwardly extending pins 17 thereon to engage and agitate the cotton and chaff. The pins are preferably inclined somewhat to the rear of the direction of rotation so that the cotton may be easily removed from the pins. Below the picker roll is a trough of foraminated material shown at 18. This trough is open on the side toward the saw cylinder and is extended upwardly to the rear of the conveyor roll 14 and is attached to the frame member at 19. The effect of the picker roll along with the conveyor above it is to agitate and move the cotton upwardly along the saw cylinder while the conveyor moves the chaff, thrown upwardly by the picker roll, toward the ends of the roll. The trough 18 is cut away at its ends, as shown best at 20 in Fig. 2, to allow the hulls and cotton to drop downwardly onto a lower conveyor roll 21.

The conveyor roll 21 is a combination conveyor and picker roll in that it has a spiral row of outwardly extending pins 22 thereon to agitate the cotton and move it longitudinally from the ends toward the middle. Below this conveyor roll is a screened trough 24, which is open toward the saw cylinder and is mounted in the frame as best seen in Fig. 1. The trough 24 is open at 23 midway of its ends to allow the discharge of hulls and chaff downwardly in the casing to the screw conveyor 25 by means of which the refuse is discharged through the end of the housing.

Above the saw cylinder is a knocker roll 26. Said knocker roll has radial pins thereon and the roll is rotated so that the side adjacent the saw cylinder is moving in the direction opposite to that of the saw. The pins thereon act to strike the hulls and chaff caught by the lint and throw them backwardly away from the saw so that it may be carried away by the conveyor 14.

To the rear of the knocker roll is a brush roll 27. This is the usual brush roll for removing the lint from the saw and throwing it to the rear through an opening indicated at 28. Said opening may be closed if desired by a valve member 29 secured to a pivoted shaft 30. Normally this valve will be open to allow the discharge of cotton downwardly upon a series of cleaning rolls 31, 32 and 33.

The cleaner rolls 31 to 33 inclusive are arranged to rotate in the housing and each successive roll is mounted at a higher elevation in the casing. Each of the rolls rotates in a counter-clockwise direction and the radial pins 34 thereon carry the cotton around beneath each of the three cleaning rolls to discharge it into the outlet chute 35.

Below the three cleaner rolls is a curved screen member 36, through which the dust and chaff may be shaken out to fall down toward the conveyor 25. The screen wall 7' previously mentioned may be moved to allow the cotton to be discharged rearwardly if desired. This is accomplished by means of a link 38 secured to the lower end of this pivoted wall or door and likewise connected at 39 to the upper end of a lever 40 secured at its opposite end to a shaft 41, which may be rotated from the outside of the casing. When it is desired to pass the cotton directly to the screen rolls 31 to 33 this may be done by closing the valves 9 and opening the valve door 7'. This is done by rotating the shaft 41 to move the lever 40 and the door 7' into the dotted line position shown in Fig. 1. The valve 29 is then closed into the dotted line position and cotton coming from the feeder cylinder 4 will be discharged onto the cleaning cylinders 31 to 33 and will be agitated and cleaned in passing under these cylinders and over the screen 36 to the discharge outlet. In the use of my machine the cotton may be treated to a thorough cleaning by passing by way of the saw cylinder 13 or may have a moderate cleaning by passing directly to the cleaner cylinders without the necessity of submitting to the operation of the saw cylinder. The cotton passing to the saw cylinder will be most effectively cleaned through the action of the agitator roll 16 at the same time that the conveyor 14 is moving the hulls and the chaff toward the ends of the housing. The advantages of this construction will be apparent to those skilled in the art.

What I claim is new is:

1. A cotton machine including a housing, a rotatable saw cylinder therein, means to feed the cotton to said cylinder, an agitator roll adjacent said cylinder, a conveyor roll above said agitator roll, arranged to move cotton along said cylinder from the middle toward the ends a toothed conveyor roll below said agitator roll to move the cotton longitudinally of said cylinder from the ends toward the middle, a knocker roll, a brush roll, and cleaning rolls to move the cotton away from said cylinder.

2. A cotton machine including a housing, a rotatable saw cylinder therein, means to feed the cotton to said cylinder, an agitator roll adjacent said cylinder, a conveyor roll above said agitator roll, a toothed conveyor roll below said agitator roll to move the cotton longitudinally of said cylinder, said conveyor rolls being arranged to move the cotton in opposite directions along said cylinder troughs below said agitator roll and said toothed conveyor roll, said troughs having openings therein to discharge the hulls, a knocker roll, a brush roll above said cylinder to remove the cotton therefrom and pass the same to cleaning rolls, and cleaning rolls to move the cotton away from said cylinder.

3. In a cotton machine, a housing, a feeder at the upper end thereof, a concave wall enclosing the lower side of said feeder, valve members in opposite sides of said wall, one of said valves being adapted to open and discharge the cotton forwardly, and the other to discharge it rearwardly of the machine, a hulling apparatus in the forward side of said housing, a valve adapted to close the rearward side of said apparatus, and a cleaner roll in the rearward side of said housing adapted to receive the cotton passing either of said valves to move the cotton from the said housing.

4. In a cotton machine, a housing, a feeder at the upper end thereof, a concave wall enclosing the lower side of said feeder, valve members in opposite sides of said wall, one of said valves being adapted to open and discharge the cotton forwardly, and the other to discharge it rearwardly of the machine, a hulling apparatus in the forward side of said housing, a valve adapted to close the rearward side of said apparatus, an upwardly inclined screen in the rearward part of said housing, and cleaner rolls positioned to receive cotton either from said feeder or said hulling apparatus and to move the cotton over said screen to discharge the same from said housing.

JOHN ARNOLD STREUN.